UNITED STATES PATENT OFFICE 2,276,343

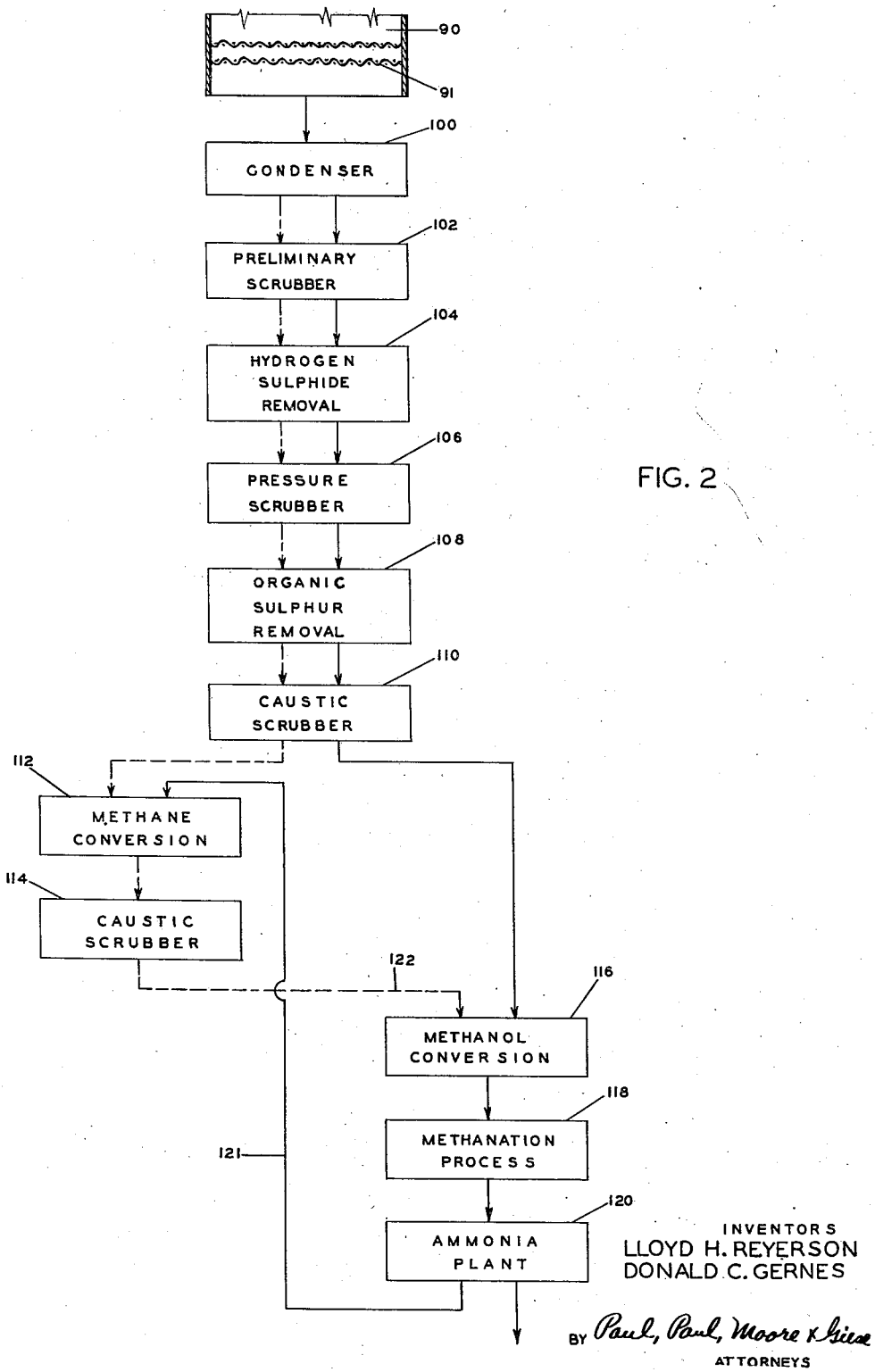

METHOD FOR GASIFYING LIGNITE

Lloyd H. Reyerson, St. Paul, and Donald C. Gernes, Minneapolis, Minn., assignors to Regents of the University of Minnesota, Minneapolis, Minn., a corporation of Minnesota Application September 23, 1938, Serial No. 231,386

8 Claims. (Cl. 48—202)

The present invention relates to the treatment of lignite for the production of gaseous products, particularly hydrogen.

We have discovered that when lignite is heated the water which it contains in its natural state forms steam in the lignite. When the heating is carried out under conditions such that the water which is driven off as steam is caused to traverse hot freshly charred lignite, a reaction ensues at a relatively low temperature. This reaction liberates a relatively large quantity of mixed gases in which hydrogen is a major constituent and in which a relatively small amount of carbon monoxide is present.

We have discovered that the reaction of lignite in accordance with our method may be carried out at relatively low temperatures without undue sacrifice of gases produced. In this feature our reaction and method differentiates sharply from methods using coal or coke, for these require high temperatures in order to obtain commercially acceptable yields of gases. The high temperatures which must be used for coal and coke reactions cause a large percentage of carbon monoxide to be produced, and since carbon monoxide can be removed only with difficulty and at considerable expense, it is considered undesirable where the mixed gases are used as a source of hydrogen.

It is therefore an object of the invention to provide such a process and an apparatus for producing gaseous mixtures rich in hydrogen and low in carbon monoxide, from lignite.

Due to the relatively low carbon monoxide content of the gaseous mixture produced in accordance with our procedure, the mixture may be fractionated readily without the use of all of the fractionating and purification procedures now commonly used in the preparation of hydrogen from coal or coke. As a result hydrogen may be produced, which is of such purity that it may be used for many refined procedures, as for example, for the synthesis of ammonia.

It is therefore an object of the present invention to provide a process and apparatus for treating lignite so as to produce a vapor mixture rich in hydrogen and other valuable constituents which may be fractionated and purified readily to yield nearly pure hydrogen. It is a further object to produce nearly pure hydrogen from lignite. It is a further object to provide a combined process for producing and purifying gases to yield nearly pure hydrogen.

It is a further object of the invention to produce a mechanism for carrying out the treatment of lignite and for the production of hydrogen-bearing vapors from lignite. It is a further object of the invention to provide such a mechanism in combination with other mechanisms for the production of relatively pure hydrogen.

When lignite is heated it yields some carbon monoxide in addition to hydrogen as constituents of a vapor mixture, but we have discovered that the yield of hydrogen is favored and the yield of carbon monoxide is held at a minimum in a preferred relatively low temperature range, and it is, therefore, an object of the invention to react lignite under such conditions.

We have also discovered that if water vapor is added while lignite is being processed by heating in the presence of moisture naturally present in the lignite, that hydrogen-containing vapors are produced in addition to those produced merely by heating the lignite and that such additional total yield of hydrogen may be obtained until the lignite is partially or totally consumed, as desired. It is, therefore, an object of the invention thus to process lignite in the presence of water naturally occurring in the lignite, and in the presence of added water vapor, to produce vapors rich in hydrogen as a step in the production of products including hydrogen, from lignite. It is also an object of the invention to provide an apparatus for carrying out such processes involving the addition of water, and to produce a mixed vapor product rich in hydrogen and other valuable gaseous constituents.

We have discovered further that the reactivity of lignite decreases when exposed to air, particularly when in a finely divided form, and that from the standpoint of yield of hydrogen, it is desirable to use freshly mined and crushed lignite. It is therefore an object of the invention to provide a method and apparatus for reacting freshly mined and crushed lignite to yield hydrogen-rich vapors.

We have also discovered that gas mixtures of various compositions may be obtained in the process by heating lignite in the presence of naturally occurring moisture and added moisture, by varying the position at which the additive moisture is introduced into the reacting lignite mass. It is, therefore, a further object of the invention to provide processes in which the added moisture is added at various times and positions and apparatus for carrying out such processes. It is also a correlative object of the invention, first to heat lignite to produce vapors which are rich in hydrogen due to the inherent moisture of the lignite, and then as a further combined procedure to react said heated lignite with additive moisture in the same or in a different zone to produce additional hydrogen containing vapors for collection with the initially produced vapors, and to produce products including relatively pure hydrogen by such a procedure. It is a further object to provide an apparatus for carrying out such a process.

We have also discovered that the process of heating lignite, in the presence of water naturally occurring in the lignite, or added water, to produce vapors rich in hydrogen and other valuable constituents may be enhanced by the addition of a catalyst and that the purification procedure by which relatively pure hydrogen may be produced may likewise be facilitated by such addition.

It is, therefore, an object of the present invention to provide a process of reacting lignite by heating it in the presence of such catalyzing and purification expediting ingredients.

Other and further objects and features of the invention will be apparent from the description of the invention, drawings and claims herein.

The invention is illustrated with reference to the drawings in which

Figure 2 is a schematic representation of the purification processes, and as a whole is a flow chart of the several operations constituting the purification and utilization of the gaseous products of the invention.

Figure 1:
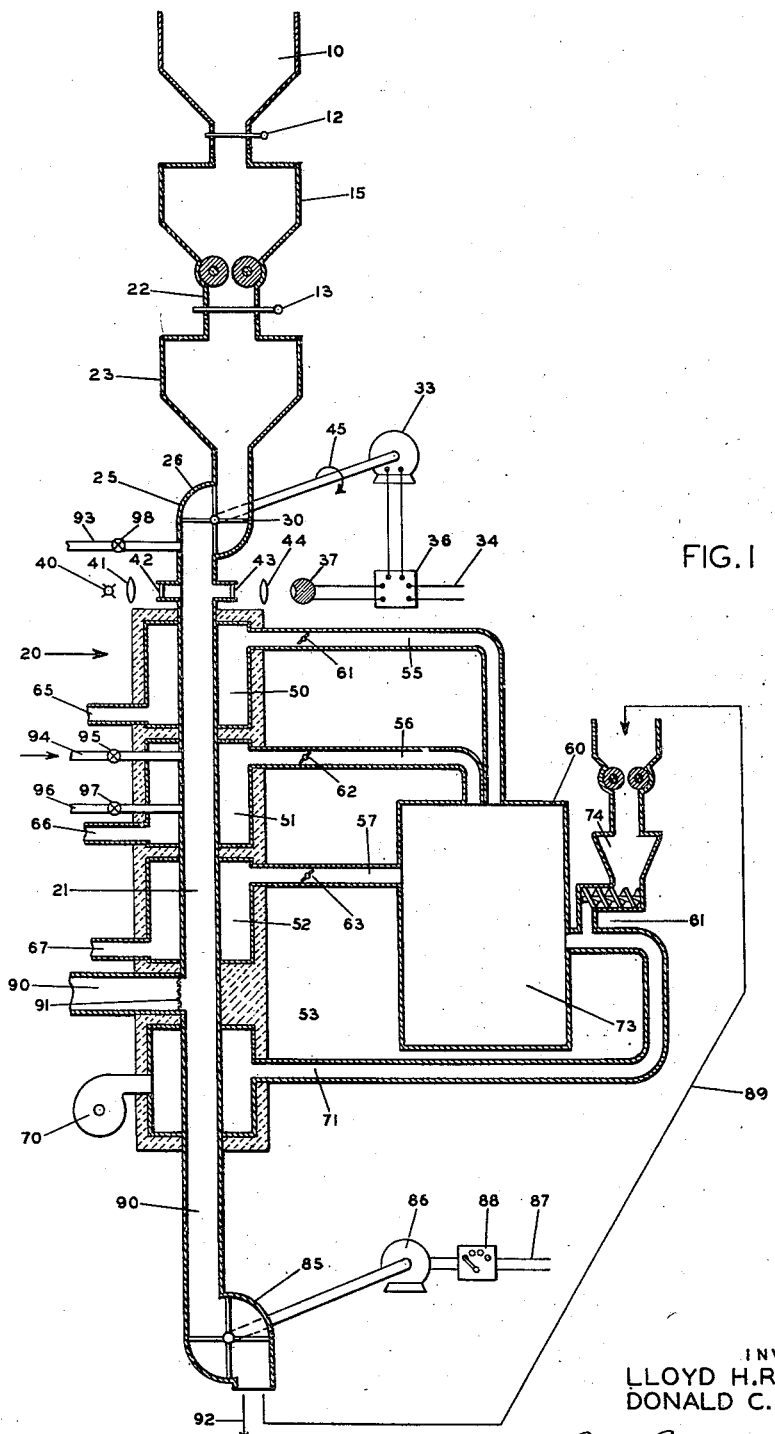
Figure 1 is a schematic representation of a portion of the apparatus used in carrying out the invention including an apparatus for reacting lignite to produce mixed gases rich in hydrogen.

At certain places in the world there are enormous deposits of a natural substance, known as lignite, which is one of the leftovers of the abundant vegetation prevailing when the world was younger. Lignite is carbonaceous in character and stands between peat and sub-bituminous coal in age and condition of development. Lignite from the North Dakota fields is exemplary of the type of lignite used in the present invention.

Lignite is of relatively low commercial value as a fuel because, among other things, it contains large quantities of moisture, some of which is so tightly bound to the remaining constituents that its removal can be effected only at elevated temperatures and by relatively expensive processes. The manner in which the water is bound in the lignite is not completely understood, but there is evidence which supports the belief that some of the water at least, is adsorbed or that it is bound molecularly.

The total water content of lignite, including the very tightly bound water is about 25–40 per cent, and in this, lignite is unlike the bituminous or anthracite coals, which normally have only about five to twelve per cent water, respectively, and unlike green vegetation which normally contains sixty to ninety per cent water. This relatively high water content of lignite, which is a disadvantage when the lignite is used as fuel, is utilized in the processes of the present invention for the production of hydrogen-rich gases from the lignite. The gases produced are of a composition such as to facilitate ready purification for such uses as in the synthesis of ammonia.

According to the preferred method of carrying out the present invention, lignite is reduced to small lump size and is then passed slowly through an elongated reaction vessel which is heated throughout a selected portion of its length. The temperature of the lignite is raised as it is progressed through the reaction vessel, until the temperature is between about 500° C. and about 850° C., preferably about 700° C. The lignite is maintained at this temperature for an extended period until a considerable proportion of the carbonaceous ingredients of the lignite has been utilized in the production of valuable gases, according to the reactions explained below. The lignite is thereafter allowed to move further along the reaction vessel, is cooled below oxidation temperature, and finally the residue is discharged.

As the lignite moves through the reaction vessel and its temperature is raised, vapors are given off which contain steam generated from the large water content of the lignite. The reaction vessel is constructed so that vapors generated as the lignite is heated are caused to flow in the directions of the lignite flow. Since the volume of vapors is large they accordingly flow through the previously heated lignite which is farther along the tube. Stated another way, the vapors move faster through the reaction tube than does the lignite and are thus forced through hot freshly charred lignite.

We have discovered that these circumstances are conducive to a high yield of valuable gases which contain a major proportion of hydrogen because water vapor is generated in situ for reaction with the hot carbonaceous material, and because the water vapor is carried through highly reactive, freshly charred lignite. It may also be that the high reactivity is due to self-catalysis. At any rate the production of gases is facilitated, and only very moderate temperatures are required for an abundant production of gases, as compared with the temperatures used in processes for producing gas from coal or coke. In this connection it is recalled that the process for producing gas from coal or coke requires temperatures of from 1000° C. to 1200° C. These high temperatures require expensive, heat-resisting apparatus, whereas in our process, the 500° C. to 850° C. requires only ordinary materials. This is a considerable advantage. Furthermore, the moderate temperatures of our process favor the production of hydrogen (the wanted constituent) rather than carbon monoxide, the undesirable constituent. In our process the carbon monoxide is only from five to twelve per cent and may easily be held as low as seven per cent, whereas, in commercially acceptable processes using coal or coke the carbon monoxide ranges from 40 to 45 per cent.

One form of apparatus for carrying out the method of the present invention is schematically illustrated in Figure 1. This illustrative embodiment comprises a raw lignite storage chamber 10 which is mounted in an elevated position by suitable framing, not shown. The delivery tube 11 at the bottom of the storage chamber 10 is provided with a sliding gate 12 for controlling the downward flow of raw uncrushed lignite, into the closed top hopper of crusher 15. The crusher may be of any suitable type such as the roll crusher illustrated. If desired, a screening device may be provided below the crusher 15 for the removal of fines not suitable for the reaction, and these may be burned directly for the production of process heat.

Below the crusher there is positioned the reaction tube mechanism generally designated 20. This mechanism consists of an elongated reaction tube 21, which is provided at its upper end with a lignite feeding mechanism generally indicated 25. Mechanism 25 is capable of feeding the lignite downwardly into the reaction tube 21 and comprises a cylindrical housing having an upwardly extending tangential inlet tube 27 and a downwardly extending outlet 28 which communicates directly with reaction tube 21. Within the cylindrical housing there is positioned a multi-vane feed wheel 30 mounted upon axle 31. The wheel 30 is dimensioned so as to fit snugly within the housing 26 and in every position prevents the lignite from falling into tube 21 and provides a baffling effect against the up-flow of gases. The hopper 23 above feed mechanism 26 is closed and is connected to the spout 22 of crusher 15. Spout 22 is provided with a slide gate 13 which positively prevents up-flow of gases. In use, the gate 13 is closed and the gate 12 opened to fill the hopper of crusher 15, whereupon gate 12 is closed and gate 13 opened and the crusher operated to crush the lignite and fill hopper 23 of the feed mechanism. In this way there is always one slide gate closed which prevents up-flow of gases from the reaction tube 21.

The wheel 30 is arranged to be driven by motor 33 which is supplied with power from line 34. The motor preferably has a reduction gearing, not illustrated, to drive wheel 30 slowly. A relay control box 36 which is actuated from photocell 37 is provided for controlling the operation of the motor, the photocell being positioned so as to be illuminated by light from light source 40. The light source 40 is arranged at one side of the reaction tube 21 and is provided with a condenser lens 41 for projecting light through window 42 of tube 21, thence across the tube and through a second window 43 and through lens 44 to photocell 37. The windows 42 and 43 are gas-tight and are protected so as not to be obstructed by entrained material. When the tube 21 is empty light from source 40 is projected therethrough and falls upon photocell 37, which thereupon operates relay 36 to a condition such that energy is supplied to motor 33. The motor revolves slowly in the direction of arrow 45 and gradually fills tube 21. When completely filled, light is shut off from the photocell and the power supply to the motor is interrupted. When the material settles in the tube, light is again projected upon photocell 37 and the operation of motor 33 and feed-wheel 30 is resumed. In this way tube 21 is constantly kept filled with fresh, ground lignite.

The reaction tube 21 may vary widely in cross-sectional area and length provided adequate heat is supplied as hereinafter explained, and sufficient length is available for the reaction of the lignite and water vapor to be completed. For a furnace capable of handling twenty pounds per hour a tube six inches in diameter and having an effective length of eleven feet, is used.

Around the reaction tube there is positioned a plurality of heating jackets 50, 51 and 52 and a heat extracting jacket 53. Heat is supplied to the jackets 50, 51 and 52 by tubes 55, 56 and 57 which extend from furnace 60. Tubes 55, 56 and 57 are supplied with dampers 61, 62 and 63 for the regulation of the heat input to each jacket.

Furnace 60 may be of any desired type but is preferably provided with a powdered fuel burner generally designated 61. The fuel is preferably lignite fines, and/or a proportion of the lignite char which is discharged from the reaction tube 21 as hereinafter explained. If desired, the furnace 60 may be provided with steam generating surfaces, not shown, for supplying process steam and for auxiliary purposes as hereinafter explained.

The heat inlet tubes 55, 56 and 57 are connected to the tops of the chambers 50, 51 and 52, respectively, and at the opposite lower portions of the chambers there are provided outlet vents 65, 66 and 67. The circulation of the heating gases through each of the chambers is such that adequate heat exchange takes place to tube 21. If desired, baffling or suitable brick checkerwork may be provided to enhance the heat exchange.

Cooling air is introduced into chamber 53 by way of inlet fan 70 which discharges into the upper portions of the chamber, while the outlet is by way of pipe 71 from the lower portion of the chamber. The heat exchange of cooling air may likewise be regulated in this chamber by the use of baffles or brick checkerwork, not illustrated.

Pipe 71, which carries heated air from chamber 53, communicates with the combustion chamber 73 of furnace 60. In this way the overall heat efficiency of the process is maintained at a high level. If desired, this efficiency may be even further improved by utilizing the heat of gases leaving vents 65, 66 and 67 for further heating the air to furnace 60 or by utilization in waste heat boilers.

Above the chamber 53 the tube 21 is provided with a branch 90 which extends laterally to carry off generated gases. Branch 90 is provided with screen 91 which inhibits the flow of lignite char into the gas line. By positioning screen 91 in line with the wall of tube 21, the downflowing lignite char produces sufficient abrasion on the screen to keep the interstices relatively open. Any dust passing through the screen may be removed periodically or by a small screw conveyor in branch line 90.

Tube 21 is provided at its lower end with a discharge mechanism 85 which is the same as mechanism 25 described above, except that the drive is from a constantly rotatable variable speed motor 86. The motor is fed from power source 87 and the speed is varied by regulator 88. The rate of feed through mechanism 85 is much less than the average rate through mechanism 25 since only a residual proportion of lignite is withdrawn as char. A portion of the residual lignite is carried to the hopper 74 of powdered fuel burner 61 by an automatic conveyor apparatus diagrammatically represented by arrow 89. Another portion may under certain circumstances be moved in the direction of arrow 92 to a second reaction mechanism substantially the same as reaction tube 20, all as explained below.

The mixed gases generated in the reaction tube 21 are discharged into the processing and purification system illustrated in Figure 2.

At spaced intervals along the reaction zone of tube 21 there are provided a plurality of inlet pipes 93, 94 and 96, which are provided with regulating valves 98, 95 and 97, respectively. These inlet pipes are used singly or in multiple for the introduction of process steam for certain modes of operation as will be outlined hereinafter.

The reaction mechanism illustrated in Figure 1, or a plurality of such mechanisms in series may be operated in a variety of manners as follows:

EXAMPLE I—*Without added process steam*

Under this condition of operation raw lignite, which is preferably freshly mined and crushed, is fed into the reaction mechanism 20 by way of the crusher 15 and feed mechanism 25. Tube 21 is kept full and the lignite moves down slowly as it is consumed in the reaction and as withdrawn by mechanism 85.

In a typical run of five hours the crushed lignite was fed into tube 21 at the rate of 20.6 pounds per hour and residual unreacted lignite char withdrawn at the rate of 8.48 pounds per hour. During the reaction the wall of tube 21 was maintained at an average temperature of 660° C. throughout chambers 51 and 52 and the temperature of the lignite while passing through chambers 51 and 52 raises to a maximum of about 640° C.

The lignite carried 35 per cent of water and no additional process water or steam was added. Stated another way, 7.21 pounds of water per hour was carried into the reaction tube in the lignite.

The vapors and gases discharged through screen 91 were composed of steam and a mixture of gases. The steam was separated at the rate of 5.3 pounds per hour and the residual dry gases amounted to 133 cubic feet per hour and was of the following composition:

|  | Per cent |
|---|---|
| Hydrogen | 46.5 |
| Carbon monoxide | 7.9 |
| Methane | 11.6 |
| Carbon dioxide | 27.4 |
| Oxygen and nitrogen | 5.9 |
| Various other gases | 0.6 |

Otherwise stated, 6000 cubic feet of hydrogen was produced for each ton of lignite charged.

The gases produced in accordance with this mode of operation are a rich source of hydrogen. The heat value of the gases is about 398 B. t. u. per cubic feet after the removal of the carbon dioxide. When enriched with a relatively small amount of butane or other hydrocarbon, they are also valuable gases for domestic use. The mixture may be used directly as a heating gas and is especially useful as a reducing gas in the production of high-grade iron ore from low-grade ore, and for other ore treating and iron making operations.

The residual lignite char produced in accordance with the above procedure, which constitutes about 41% of the original lignite is, in part used for supplying the heat for the process and for auxiliary purposes. Thus a portion is diverted to feed the burner 61 which produces process steam and heat for chambers 50, 51 and 52. About ten to fifteen per cent of the original is needed for such purposes. The excess of the lignite char over that necessary for process needs, or about twenty-five to thirty per cent of the original lignite is available for production of gases rich in hydrogen, as set forth hereinafter.

EXAMPLE II.—*Without added process steam*

When the temperature of the reaction tube 21 is raised slightly there is an increase in the percentage of the hydrogen and carbon monoxide constituents and a reduction in the percentage of other constituents of the resultant mixed gas.

Thus in another typical run of eight hours, the crushed lignite was fed into reaction tube 21 at the rate of 22.3 pounds per hour. During this run the temperature of the wall of tube 21 was maintained at an average of about 716° C. throughout chambers 51 and 52, and the temperature of the lignite while passing through chambers 51 and 52 rose to a maximum of about 690° C. Unreacted lignite was discharged by way of tube 90 at the rate of 8.24 pounds per hour.

In this instance the lignite contained 33% water and no additional process water or steam was added. Stated another way, 7.35 pounds of water per hour was introduced in the lignite.

The vapors and gases discharged through screen 91 were composed of steam which was produced at the rate of 5.02 pounds per hour, and a mixture of gases which were produced at the rate of 178 cubic feet of dry gas per hour. These gases had the following composition:

|  | Per cent |
|---|---|
| Hydrogen | 49.5 |
| Carbon monoxide | 11.7 |
| Methane | 9.3 |
| Carbon dioxide | 25.3 |
| Oxygen and nitrogen | 4.1 |
| Various other gases | 0.3 |

Otherwise stated, 8000 cubic feet of hydrogen was produced per ton of lignite charged.

Thus, by increasing the temperature slightly the per cent of hydrogen can be increased at the expense of decreasing the methane and increasing the carbon monoxide. Where the gas is used for heating purposes or for ore treatment, the increase in carbon monoxide content occasioned by this increase in operating temperature is not a disadvantage.

EXAMPLE III.—*With some added steam*

In the apparatus shown in Figure 1 there are provided a plurality of inlet pipes 93, 94 and 96 for the introduction of steam into the lignite as it is passing downwardly through reaction tube 21. Steam may be introduced in one or the other of pipes 93, 94 and 96 and the amount regulated as desired. When steam is added, gases are formed in addition to those formed by heating the lignite as in Examples I and II and the percentage of lignite discharged at 90 is reduced as compared with that discharged in the foregoing examples.

In a typical run of 28 hours, the raw crushed lignite was fed into tube 21 at the rate of 22.2 pounds per hour and residual unreacted lignite was discharged at the rate of 8.2 pounds per hour. During the procedure, the wall of reaction tube 21 was maintained at an average of about 744° C. in chambers 51 and 52, and the lignite temperature rose to a maximum of about 710° C, while passing therethrough.

In this test the lignite carried 33.6% water, or stated another way, 7.45 pounds of water per hour was introduced as a component of the lignite. In addition 9.55 pounds per hour of steam was introduced into reaction tube 21 by way of pipe 93.

The vapors and gases discharged through screen 91 were composed of steam which was produced at the rate of 14.55 pounds per hour and a mixture of gases was produced at the rate of 190 cubic feet of dry gas per hour.

The gaseous mixture had the following composition:

|  | Per cent |
|---|---|
| Hydrogen | 52.5 |
| Carbon monoxide | 7.0 |
| Methane | 8.5 |
| Carbon dioxide | 29.0 |
| Oxygen and nitrogen | 2.5 |
| Various other gases | 0.5 |

Otherwise stated, 9000 cubic feet of hydrogen was produced per ton of lignite charged.

EXAMPLE IV.—*With a large amount of added steam*

By further increasing the rate of steam fed into the reaction tube 21 a still greater gas production and hydrogen production per ton of lignite, may be obtained.

In a typical run of 19 hours the crushed lignite was fed into the reaction tube at the rate of 18.7 pounds per hour. During this run the temperature of the wall of tube 21 was maintained at an average of about 750° C. in chambers 51 and 52 and the temperature of the lignite rose to about 710° C. maximum, in passing therethrough. Unreacted lignite char was discharged by way of tube 90 at the rate of 5.8 pounds per hour during the run.

In this instance the lignite contained 30.8% water, or in other words 5.75 pounds per hour of water was carried into tube 21 as a component of the lignite. In addition 14.9 pounds of steam per hour was introduced by way of tube 93.

The vapors and gases discharged at screen 91 were composed of steam which was discharged at the rate of 15.54 pounds per hour and a mixture of dry gases which were produced at the rate of 243 cubic feet of dry gas per hour. The composition of this gaseous mixture was:

| | Per cent |
|---|---|
| Hydrogen | 56.8 |
| Carbon monoxide | 6.6 |
| Methane | 6.2 |
| Carbon dioxide | 28.4 |
| Oxygen and nitrogen | 1.5 |
| Various other gases | .5 |

Stated another way, 14,700 cubic feet of hydrogen was produced per ton of lignite treated in the furnace.

EXAMPLE V.—*Using fresh lignite char*

In some instances it is desirable to utilize as the starting material the lignite char discharged by way of pipe 90 in the previous examples. When lignite char is the starting ingredient all of the water vapor utilized in the reaction must be introduced into tube 21 from an outside source.

In a typical run of twelve hours, lignite char which had been freshly produced in accordance with Example III was fed into reaction tube 21 at the rate of 7.8 pounds per hour. During this run the temperature of the wall of tube 21 was maintained at an average of about 712° C. in chambers 51 and 52, and the lignite char was heated to a maximum of about 700° C. in passing therethrough. Unreacted char was discharged through pipe 90 at the rate of 5.5 pounds per hour.

The lignite char contained no appreciable moisture but 13.35 pounds of steam per hour was introduced by way of tube 93.

Vapors and gases discharged through screen 91 included steam, which was separated at the rate of 7.2 pounds per hour and a mixture of dry gases which were produced at the rate of 154 cubic feet of dry gas per hour. The latter had the following composition:

| | Per cent |
|---|---|
| Hydrogen | 60.5 |
| Carbon monoxide | 8.0 |
| Methane | 2.2 |
| Carbon dioxide | 26.5 |
| Oxygen and nitrogen | 2.7 |
| Various other gases | 0.1 |

Otherwise stated, hydrogen was produced at the rate of 84,500 cubic feet of hydrogen per ton of char converted.

EXAMPLE VI.—*Multiple unit systems*

It is desirable in some instances to combine two or more reaction mechanisms so that the outlet from feed mechanism 85 of one unit feeds directly into the feed mechanism of the next unit in the series.

Two units thus coupled in series may be operated with or without the introduction of process steam in the first unit when the first unit is operated in accordance with the schedule set forth in Example I and the second unit operated in accordance with Example V the total volume of hydrogen produced is 14,600 cubic feet per ton of lignite charged. When steam is introduced into the first unit, as in Example III there is 14,200 cubic feet of hydrogen produced per ton of lignite charged.

EXAMPLE VII.—*With catalyst*

Under some conditions it is desirable to carry out the above processes in the presence of a gasification catalyst. Thus in any of the foregoing examples any desired gasification catalyst such as powdered calcium carbonate may be added to the freshly crushed lignite and the mixture charged into the furnace. For such conditions it is desirable to add about five per cent of calcium carbonate based upon the amount of lignite present. The presence of the catalyst facilitates the production of gases.

EXAMPLE VIII.—*Production of nearly pure hydrogen from lignite*

By comparing Examples I and II it will be seen that by increasing the operating temperature from 660° C. to 716° C. the carbon monoxide content is increased from 7.9% to 11.7%. Further increases of temperature raises the carbon monoxide content further. In prior processes for the production of nearly pure hydrogen from coal and coke, the carbon monoxide content is from 40 to 45 per cent of the total yield due to the fact that high operating temperatures must be used to obtain commercially satisfactory yields. As pointed out above we have discovered that by using lignite, which has a high water content, or lignite char, as the carbonaceous material, commercially satisfactory yields may be obtained at low temperatures such that only a small percentage of carbon monoxide is produced. The reason for the high reactivity of lignite as compared with coal or coke is not entirely understood but it may be due to the development of catalytically active surfaces throughout the char which is produced from lignite. Whatever may be the reason, it is a fact that the production of gases from lignite occurs at very much lower temperatures than required for the production of comparable yields of gases from coal or coke.

Where high carbon monoxide content primary gaseous mixtures such as those produced from coals and coke by prior processes are used to produce nearly pure hydrogen for processes such as the synthesis of ammonia, the commercial purification procedures have of necessity included a water gas conversion procedure for converting the unwanted carbon monoxide into the desired hydrogen, and even with this procedure, a subsequent step for the final elimination of the residual carbon monoxide is essential.

According to the present invention we have discovered that we are able to produce nearly pure hydrogen from lignite without the use of such a water gas conversion.

According to this procedure we treat lignite in accordance with any of the foregoing examples to produce a mixture of gases rich in hydrogen and having a relatively low carbon monoxide content. We then continue the process of producing the nearly pure hydrogen by a series of treatments which are diagrammatically outlined in Figure 2.

As indicated in Figure 2, gas which is discharged from the end of 90 of furnace tube 21 is sent through a series of treatments as follows:

The gas flow is indicated in Figure 2 by arrows, the solid arrows being the procedure when using a relatively low methane content gaseous mixture (such as produced in Example IV or V) and the dotted arrows indicating the added steps when using a relatively high methane-content gaseous mixture (such as produced in Example I).

Considering first the flow as indicated by the solid arrows, the gaseous mixture first proceeds through a condenser 100 where the steam, which is admixed with the gases, is removed as water. A considerable proportion of tar is also removed in the condenser and may be recovered. A certain amount of dust and grit is removed with the condensate in this procedure. The residual gaseous mixture is then passed through a low pressure cold water scrubber 102 which removes the residual dust, some ammonia which is formed during the furnace treatment of the lignite, some of the hydrogen sulphide and $CO_2$ which may be present, and most of the tar, not removed by the condenser. If necessary at this point, further removal of the tar could be accomplished by electrical precipitation or additional scrubbing.

The thus cleaned gases are then passed through a solution such as ammonium thioarsenate, $(NH_4)_3AsO_3S$ in chamber 104, which removes all but traces of the hydrogen sulphide present, and then through a cold water pressure scrubber 106 which removes the carbon dioxide. The gaseous mixture is then passed over hot lime or activated aluminum oxide in chamber 108 which converts any organic sulphur components into hydrogen sulphide, and then through a caustic scrubber in chamber 110 which removes all traces of hydrogen sulphide and carbon dioxide.

To this point in the process the procedure is the same whether the gaseous mixture used at the start contains a relatively high or a relatively low methane content. In the above assumed case, with relatively low methane content, the gaseous mixture from the caustic scrubber 110 passes directly to a methanol conversion apparatus 116. The gas at this stage contains hydrogen and some carbon monoxide, although, as explained above, the carbon monoxide content is sufficiently low so as not to require a water gas conversion procedure as a step in the purification procedure.

The gaseous mixture containing some carbon monoxide is compressed to a pressure of from 200 to 300 atmospheres and is then passed over a catalyst such as chromium or zinc oxide, which may if desired contain a small percentage of copper oxide. Under such conditions the hydrogen and carbon monoxide combine to give methanol which is then removed.

The gas leaving the methanol conversion apparatus 116 contains less than 1% carbon monoxide, a large percentage of hydrogen, and some methane and nitrogen. This mixture is then passed through a methanation apparatus 118 in which the carbon monoxide is converted quantitatively to methane. This is accomplished by passing the gas through a metallic nickel catalyst at from 250° to 300° C. The gas leaving the methanation apparatus 118 contains less than .005% of carbon monoxide, a small percentage of methane and nitrogen and the remainder hydrogen, and is hence nearly pure hydrogen. This is directly usable in the synthesis of ammonia which is accomplished at elevated temperatures and pressures in the presence of catalysts according to the usual procedures in apparatus 120. Methane is not objectionable in that it is not poisonous to the catalysts used in the ammonia synthesis and merely accumulates until it constitutes from 20% to 30% of the gas in the ammonia synthesis cycle and at which time the methane is purged and either burned or preferably treated as stated below.

Where the starting gaseous mixture contains a relatively large amount of methane the process of producing nearly pure hydrogen from lignite also includes the additional methane conversion step. The flow of relatively high methane content gas (such as is produced in Example I) which is indicated by the dotted arrows in Figure 2 is the same as that for the relatively low methane content gas through the caustic scrubber 110. The partially purified gaseous mixture is then passed through a methane conversion apparatus, wherein the methane combines with steam to produce hydrogen and carbon monoxide and dioxide. The gaseous mixture which then has a low methane content is then passed through a caustic scrubber 114 which removes the carbon dioxide and thence to the methanol conversion and other apparatuses 116—120 previously described.

Where low methane content gas is used for the starting material, and methane accordingly accumulates in the ammonia cycle all as previously described, the purged methane may be conducted through a small methane conversion apparatus consisting of units 112 and 114. The flow of purged methane-hydrogen mixture is shown by the interconnecting line 121 in Figure 2. It is understood that after treatment in the methane conversion apparatus 112 and caustic scrubber 114, the low methane content gas is returned to the methanol conversion unit 116 as denoted by arrow 122 in Figure 2.

It is thus apparent that by the use of our combined procedure, hydrogen which is so nearly pure that it can be used in the ammonia synthesis, may be produced from lignite, and that in such process the carbon monoxide originally produced is so low as not to require a water gas conversion process for the primary step in the removal of the carbon monoxide.

It is obvious that many variations may be made in the above described apparatus and procedures without departing from the spirit of the invention. For example, in the original productions of the gaseous mixture from lignite, steam may be admitted in more than three places or at other places than illustrated, the produced gases may be recycled through the lignite treating apparatus, a variety of catalysts may be used, particularly in the recycling procedure, as for instance, a methane conversion catalyst, or water gas conversion catalysts. Different feed mechanisms may be used and different heating arrangements are readily apparent in view of the teaching of our inventions.

Wide modifications may be made in the purification procedures depending upon the uses to which the final product is put, or only simple purification steps such as scrubbing, may be used where the gaseous mixture is used in, for example, the reduction or treatment of iron ore or the making of iron. Furthermore, the lignite treatment may be operated in two stages as set forth in Example VI and the gaseous mixture produced in the first stage, may all be used in, for example the treatment of iron ore, and the gaseous mixture produced in the second stage of lignite treatment may be used, after purification, in chemical processes such as the ammonia synthesis.

These modifications are merely illustrative. Others may obviously be made without departing from the spirit of the invention described and claimed herein.

We claim as our invention:

1. A continuous process of making from lignite a gaseous mixture rich in hydrogen, which comprises, introducing a stream of lignite having a natural water content of 25-40% into a closed system, moving said lignite through a preheating zone where the temperature of the lignite is elevated to a temperature in the range of about 500 to about 850 degrees C., continuing said movement through a reaction zone in the presence of water containing vapors generated by said preheating of the lignite while maintaining said temperature between about 500 degrees C. to about 850 degrees C., and thereafter moving said lignite through a cooling zone and removing the thus formed gaseous mixture rich in hydrogen.

2. A process of the type set forth in claim 1 wherein the lignite is freshly fractured.

3. A process of producing from lignite having a relatively high water content, a gaseous mixture rich in hydrogen which comprises, introducing a stream of lignite into a closed system, moving said lignite through a preheating zone to elevate the temperature of the lignite to a temperature between about 500 degrees C. and about 850 degrees C., thereby to drive off water containing vapors from the lignite and render the lignite highly reactive, continuing said movement of the thus formed highly reactive lignite through a first reaction zone while maintaining said temperature and while in the presence of the water containing vapors evolved by heating lignite, separating the thus produced gaseous mixture rich in hydrogen, and continuing the movement through a second reaction zone in the presence of steam and the temperature of the lignite is kept between about 500 degrees and about 850 degrees C., and separately collecting the gaseous mixture rich in hydrogen, produced in the second zone.

4. A process for gasifying lignite which comprises causing lignite having a natural water content of 25-40% to flow slowly through an elongated reaction vessel which has an extended portion of its length heated to a temperature in the range of about 500 degrees C. to about 850 degrees C., blocking the reverse flow of water containing vapors evolved when the lignite is heated in said heated portion, whereby the evolved vapors are caused to flow in the direction of the lignite flow and thus to traverse heated lignite in portions of said vessel further along in the direction of the lignite flow whereby some of said lignite is gasified and then removing the thus formed gases from the residue of the lignite.

5. A process for gasifying lignite which comprises causing lignite to flow slowly through an elongated reaction vessel which has an extended portion of its length heated to a temperature in the range of about 500 degrees C. to about 850 degrees C., blocking the reverse flow of vapors evolved when the lignite is heated in said heated portion, whereby the evolved vapors are caused to flow in the direction of the lignite flow and thus to traverse heated lignite in portions of said vessel further along in the direction of the lignite flow whereby some of said lignite is gasified, adding water vapor to the heated lignite flowing in said tube, and then removing the thus formed gases from the residue of the lignite.

6. A continuous process for rapidly making a gas rich in hydrogen, low in carbon monoxide and having only an easily removable trace of sulphur therein, which comprises gradually migrating lignite having a natural water content of 25-40% through a confined space while heating it to a temperature between about 650 degrees and about 800 degrees C., thereby to produce a highly reactive adsorptive ligniteous char, and then while continuing said migrating, heating said char to a temperature within the aforesaid range in the presence of water bearing vapors thereby to produce the aforesaid gaseous mixture and thereafter separating said gaseous mixture from the residue of the lignite.

7. A process for rapidly producing gaseous products containing a large proportion of hydrogen and a small proportion of carbon monoxide for use in organic chemical synthesis which comprises supplying lignite char to a confined elongate reaction zone and causing said char to migrate through said zone in one direction, passing a reactant gas comprising steam through said zone in the direction the char is migrating and at a faster rate of travel while maintaining said char at a temperature within the range of about 500 degrees to 850 degrees C. whereby a gaseous mixture comprising steam, a small proportion of carbon monoxide and a large proportion of hydrogen is produced and thereafter separating the gaseous mixture from the residue of the lignite char.

8. The process of producing a gaseous reactant charge for organic chemical synthesis, having a large proportion of hydrogen and a comparatively minor proportion of carbon monoxide and only easily removable traces of sulphur, which comprises substantially continuously moving a potentially reactive adsorptive lignite char through an elongate reaction zone maintained at a temperature of the char within the range of 650 degrees to 850 degrees C., and passing a reactant gas comprising steam through said zone in the direction the char is moving and at a more rapid rate of movement than that of the char so that the reactant gas comes into contact with previously partially reacted lignite char, and removing the thus formed gases containing a large proportion of hydrogen and a small proportion of carbon monoxide from said reaction zone, said gaseous product being suitable for organic synthesis as aforesaid, being substantially free of all but traces of sulphur.

LLOYD H. REYERSON.
DONALD C. GERNES.